W. P. SPARBOOM.
SIGNALING SYSTEM.
APPLICATION FILED JULY 23, 1914.

1,309,821.

Patented July 15, 1919.
3 SHEETS—SHEET 1.

W. P. SPARBOOM.
SIGNALING SYSTEM.
APPLICATION FILED JULY 23, 1914.

1,309,821.

Patented July 15, 1919.
3 SHEETS—SHEET 2.

Witnesses
Ada M. Whitmore
Frauser Jacubowitz

Inventor
Walter P. Sparboom
By H. H. Simms
his Attorney

W. P. SPARBOOM.
SIGNALING SYSTEM.
APPLICATION FILED JULY 23, 1914.
1,309,821.
Patented July 15, 1919.
3 SHEETS—SHEET 3.
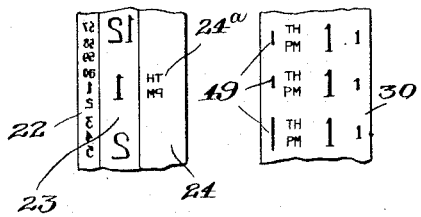
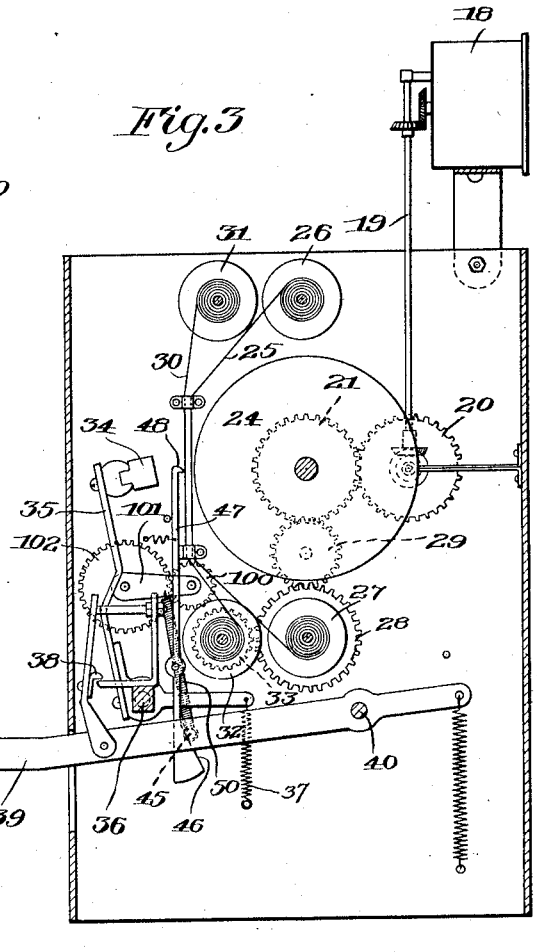
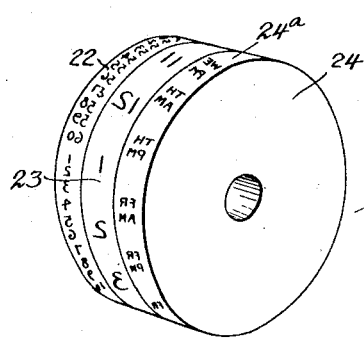
Witnesses
Ada M. Whitmore
Howard Jacobowitz
Inventor
Walter P. Sparboom
By H. H. Simms
his Attorney

UNITED STATES PATENT OFFICE.

WALTER P. SPARBOOM, OF ROCHESTER, NEW YORK.

SIGNALING SYSTEM.

1,309,821. Specification of Letters Patent. Patented July 15, 1919.

Application filed July 23, 1914. Serial No. 852,624.

*To all whom it may concern:*

Be it known that I, WALTER P. SPARBOOM, of Rochester, in the county of Monroe and State of New York, have invented a new and useful Improvement in Signaling Systems, which improvement is fully set forth in the following specification and shown in the accompanying drawings.

The present invention relates to a system of signaling for maritime vessels or ships at sea and to apparatus used in such a system, an object of the invention being to make it possible for maritime vessels to communicate with each other in such a manner that it will be possible to determine definitely the direction in which the vessels are going and in this way eliminate most if not all of the collisions at sea. Another object of the invention is to make a record of the signals given by each vessel or ship so that in case of accident the blame therefor can be properly placed upon the guilty or incompetent person.

To these and other ends, the invention consists in certain parts and combinations of parts all of which will be hereinafter described, the novel features being pointed out in the appended claims.

In the drawings:

Fig. 3 is a detail sectional view through the recording mechanism;

Fig. 4 is a detail view of the printing mechanism; and

Fig. 5 is a detail view of the tape on which the record is made.

Figure 1:
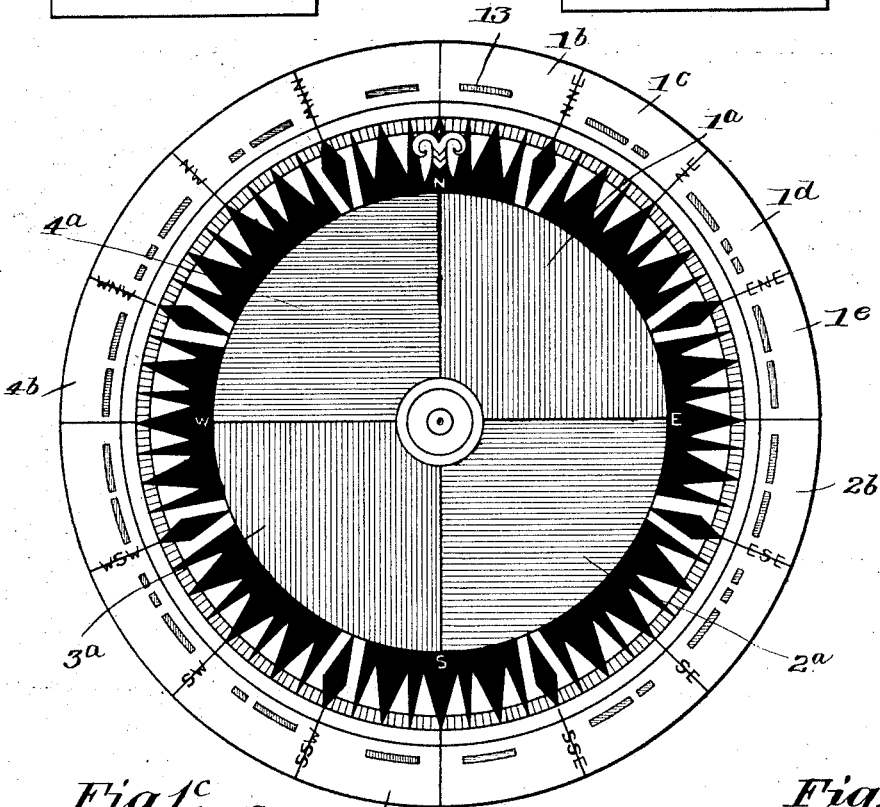
Figure 1 is a plan view of the compass rose used in the present invention and Figs. 1$^a$, 1$^b$, 1$^c$, and 1$^d$ are instruction charts which may be arranged on the bridge near the signaling devices.
Figure 2:
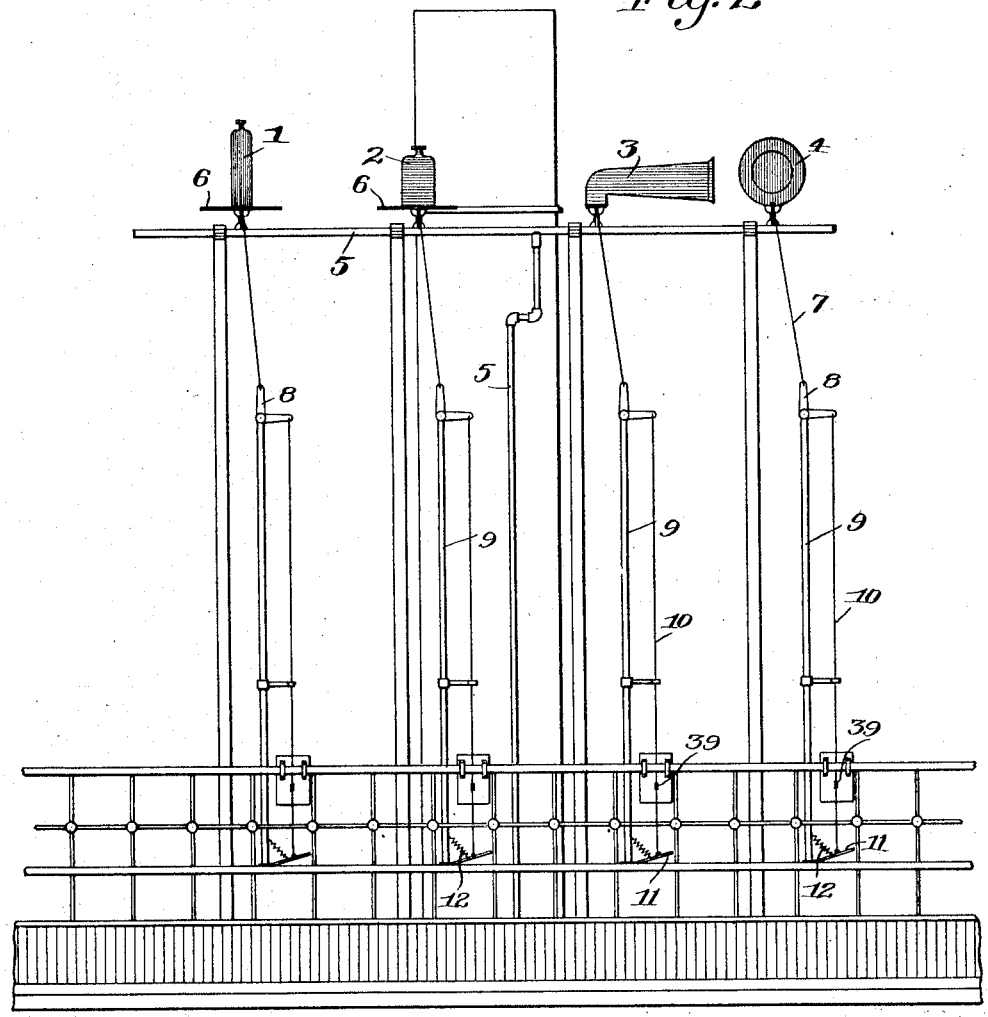
Fig. 2 is a detail view of the bridge of a vessel showing the different signaling devices employed.

According to this invention, a plurality of audible signaling devices is provided, each device giving a sound different from the others. In this instance, four of such devices indicated at 1, 2, 3 and 4 are provided, the devices 1 and 2 being in the form of steam whistles of different sounds, one being a pipe whistle and the other being a gong whistle both receiving steam by way of piping 5, and the devices 3 and 4 being in the form of horns of different sounds, one being a horn siren and the other being a shrill siren also both operated by steam from the piping 5. The whistles 1 and 2 may have disks 6 surrounding them in order to confine the sounds to the lower strata of the atmosphere.

These signaling devices are each controlled separately by their own operating mechanisms, each of which may comprise a cable 7 controlling the supply of steam of the device and connected to a bell crank lever 8 pivoted to a support 9 and operated by a cable 10 which is connected to an operating member 11 in the form of a foot piece, this operating member being normally held in a raised position by a spring 12.

In order that signaling devices may be used in connection with the compass, they are colored and the compass is divided up in a number of fields corresponding to the number of signaling devices and is also colored to correspond to the colors of the signaling devices as is shown in Fig. 1 of the drawings. It is preferred to provide four signaling devices and divide the compass into four distinct fields, the dividing lines of these fields extending in the directions of the main points of the compass, namely: north, east south and west as indicated at 1$^a$, 2$^a$, 3$^a$ and 4$^a$. The compass has its main fields still further divided as at 1$^b$, 1$^c$, 1$^d$, 1$^e$, 2$^b$, etc., 3$^b$, etc., and 4$^b$, etc. Each of the subdivisions, 1$^b$, etc., 2$^b$, etc., 3$^b$, etc., 4$^b$, etc., is provided with certain indicating marks as dots and dashes as at 13 which point out whether a long or short blast is to be given by the signaling device corresponding to the main field of the subdivision. These indicating marks are similar on different main fields. In fact, each main field has indicating marks like the other main fields. Of course, each main field may be divided into as many subfields as are desirable, it being preferred to have a small number in order that chances for confusion are reduced to a minimum. At a point adjacent to the signaling devices, charts 14, 15, 16 and 17 will be provided, one for each signaling device with suitable matter thereon to indicate the signaling device which it represents. These charts will each have dots and dashes thereon corresponding to the dots and dashes on the subdivisions of the fields of the compass.

Arranged to be operated with each signaling device, is a recording mechanism. This mechanism may be of any desired form but preferably embodies a clock 18 which, by a shaft 19, drives the pinion 20, meshing with a pinion 21 which rotates the minute wheel 22 provided on its periphery with a number of printing characters corresponding to the number of minutes in an hour. At each rotation of this wheel, the hour wheel 23 is rotated one step in a manner known in this type of a machine and at each rotation of the hour wheel, the wheel 24 is rotated one step in the same manner. The wheel 24 has characters 24ª thereon indicating the days of the weeks and also whether the time is a. m. or p. m.

Arranged to travel over the printing wheels is a tape 30 which is fed from a spool 31 to a spool 32 by means of a gear wheel 33 which, by the gear wheel 100 mounted on a swinging arm 101 is adapted to be connected to a gear 102 which is driven in any suitable manner by a motor (not shown). Normally the gear 100 lies out of mesh with the gear 33 so that the tape does not move under normal conditions. It is, however, fed quickly during the printing by throwing the gear 100 into connection between the motor gear 102 and the gear 33 in a manner to be described. Operating between the tape 30 and the time printing mechanism, is an inking ribbon 25 which is fed from a spool 26 onto a spool 27 by a gear 29 interposed between the gear 21 and a gear 28 connected to the spool 27.

For coöperation with the printing mechanism to effect the printing on the record tape 30, a platen 34 is provided arranged on a yielding arm 35 which is pivoted at 36, the platen held in the position shown by a spring 37 and being moved away from the printing mechanism by a latch 38, of well known construction in time recorders, arranged on a lever 39 which is pivoted at 40 within the casing of the recording mechanism and extends to the exterior of the casing where it is connected to the cable 10 of one of the signaling devices.

When the lever 39 is depressed, the resilient connection or spring 50 transmits motion from an arm 45 on the lever to the swinging arm 101, thereby causing the gear 100 to establish driving connection between motor gear 102 and the tape or recording sheet so that the latter is operated quickly during the signaling operation. The spring 50 permits the lever 39 to continue its movement after the connection between the gears 100 and 33 has been established. The depression of the lever 39 also causes the lateral pin or arm 45 thereon to bear on the cam portion 46 of the scribing lever 47 to press the pointed end 48 of the lever 47 against the record tape 30 and inking ribbon 25; thus producing marks on the record tape 30 as indicated at 49 in Fig. 5, these marks being long or short and corresponding to the length of time during which the lever 39 is depressed.

Let it be assumed that it is desired to signal the direction of travel of a ship with one of these apparatus thereon. If the ship be steering in the direction between NE. and ENE. the pipe whistle or signaling device 1 is operated, one long blast and two short blasts corresponding to the subdivision 1ᵈ, this operation being effected by depressing the treadle 11 of the signal 1. With the depression of this treadle, the lever 39 of the recording mechanism for such signaling device is depressed and, as a consequence, the tape feeding mechanism is operated and the platen or hammer 34 is moved away from the printing mechanism and then suddenly released to impinge upon the tape over the printing mechanism so as to cause the time at which the signal is given to be recorded on the tape 30. At the same time, the point 48 of the scribing lever 47 is moved toward the ribbon 25 and produces a line on the record tape 30 corresponding to the length of the time of the depression of the lever 39, this being due to the fact that the tape is moving under power from the motor wheel 102. In this instance, as the lever 39 is depressed, one long stroke and two short strokes, the record will appear as in Fig. 5. It will be apparent that, with a signaling system such as herein described, it will be possible for ships to communicate with each other so as to define their courses of travel and in this way collisions due to fogs and darkness will be eliminated. Should the captain of a ship be careless or incompetent so as to cause a collision, he cannot escape responsibility as records of his signals with the time at which they were given will be kept automatically, this record, of course, being maintained under lock and key so as to prevent his changing the same. It is apparent also that the system may also be employed in aerial navigation.

What I claim as my invention and desire to secure by Letters Patent is:

1. A signaling system employing a signal, and a recording mechanism comprising a time printing mechanism, a suitably driven tape on which said time printing mechanism operates, a device for marking on the tape lines corresponding in lengths to the durations of the signals, and means for operating the time printing mechanism simultaneously with each operation of such marking device to cause the printing device to operate on the tape with said marking device.

2. In a signaling system, the combination of a signal, with a recording mechanism comprising a record time printing means for operating on said record operated with the signal, and means for marking on said record in lines of lengths corresponding to the duration of the signals.

3. In a signaling system, the combination of a signal with a recording mechanism comprising a record, clock operated printing wheels for coöperation with said record to print the time of the signal, a platen for coöperation with the printing wheels, said platen being operated with the operation of the signal, and means for marking on the record in lines of lengths corresponding to the durations of the signals.

4. A signaling system comprising a signaling device, a time-controlled printing mechanism, a record tape, means for feeding said tape past the printing mechanism, an inking ribbon for the printing mechanism, a platen for coöperation with the printing mechanism to cause the latter to print on the tape, and means for causing such coöperation when the signaling device is operated.

WALTER P. SPARBOOM.

Witnesses:
HAROLD H. SIMMS,
ADA M. WHITMORE.

Copies of this patent may be obtained for five cents each, by addressing the "Commissioner of Patents, Washington, D. C."